(12) United States Patent
Maekawa

(10) Patent No.: US 8,543,018 B2
(45) Date of Patent: Sep. 24, 2013

(54) IMAGE FORMING APPARATUS AND POWER-SUPPLY CONTROL METHOD

(75) Inventor: Tomonori Maekawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 574 days.

(21) Appl. No.: 12/512,510

(22) Filed: Jul. 30, 2009

(65) Prior Publication Data

US 2010/0028030 A1 Feb. 4, 2010

(30) Foreign Application Priority Data

Aug. 1, 2008 (JP) ................................. 2008-199827
Jul. 13, 2009 (JP) ................................. 2009-164930

(51) Int. Cl.
*G03G 15/00* (2006.01)

(52) U.S. Cl.
USPC ................. 399/43; 399/37; 399/88; 320/133; 320/135

(58) Field of Classification Search
USPC .......................... 399/37, 67, 88; 320/133, 135
See application file for complete search history.

(56) References Cited

U.S. PATENT DOCUMENTS

| | | | | |
|---|---|---|---|---|
| 6,895,309 B2 * | 5/2005 | Ito | ................................ | 700/296 |
| 2005/0123315 A1 * | 6/2005 | Kishi et al. | ...................... | 399/69 |
| 2006/0222395 A1 * | 10/2006 | Yoda | ............................... | 399/69 |
| 2007/0212092 A1 * | 9/2007 | Tsujimura | ...................... | 399/69 |

FOREIGN PATENT DOCUMENTS

| | | |
|---|---|---|
| JP | 05-100516 | 4/1993 |
| JP | 07-044068 | 2/1995 |
| JP | 2000-224779 | 8/2000 |
| JP | 2002-075463 | 3/2002 |
| JP | 2005-166633 | 6/2005 |
| JP | 2005-238786 | 9/2005 |
| JP | 2007-193311 | 8/2007 |
| JP | 2008-052206 | 3/2008 |
| JP | 2008-096911 | 4/2008 |

OTHER PUBLICATIONS

Office Action issued Apr. 23, 2013 in corresponding Japanese Patent Application No. 2009-164930, filed Jul. 13, 2009.

* cited by examiner

*Primary Examiner* — Walter L Lindsay, Jr.
*Assistant Examiner* — Benjamin Schmitt
(74) *Attorney, Agent, or Firm* — Oblon, Spivak, McClelland, Maier & Neustadt, L.L.P.

(57) ABSTRACT

A detecting unit detects a usage state of a charge storage unit for each predetermined time period. A setting unit determines whether the usage state of the charge storage unit satisfies a predetermined condition for each time period, and when it is determined that the usage state satisfies the predetermined condition, sets a corresponding time period as a charge-use permitted time. A control unit determines whether a current time falls in the charge-use permitted time, and when it is determined that the current time falls in the charge-use permitted time, allows a discharging unit to discharge the charge storage unit.

7 Claims, 14 Drawing Sheets

FIG. 3

| WEEK | TIME | CAPACITOR | |
|---|---|---|---|
| | | ON | OFF |
| MON | TIME A TO TIME B | ○ | — |
| | TIME B TO TIME C | ○ | — |
| | TIME C TO TIME D | — | ○ |
| | TIME D TO TIME E | — | ○ |
| | TIME E TO TIME A | — | ○ |
| TUE | TIME A TO TIME B | ○ | — |
| | TIME B TO TIME C | ○ | — |
| | TIME C TO TIME D | — | ○ |
| | TIME D TO TIME E | — | ○ |
| | TIME E TO TIME A | — | ○ |
| WED | TIME A TO TIME B | ○ | — |
| | TIME B TO TIME C | ○ | — |
| | TIME C TO TIME D | — | ○ |
| | TIME D TO TIME E | — | ○ |
| | TIME E TO TIME A | — | ○ |
| . | . | ○ | — |
| | . | . | . |
| . | . | . | . |

FIG. 7

COPY MODE

| DAY | TIME PERIOD | TOTAL EXECUTION TIME [MIN] | NUMBER OF EXECUTIONS |
|---|---|---|---|
| MON | TIME A TO TIME B | 30 | 5 |
| | TIME C TO TIME D | 5 | 2 |
| | TIME D TO TIME E | 2 | 1 |
| | TIME E TO TIME A | 3 | 1 |
| TUE | TIME A TO TIME B | 6 | 2 |
| | TIME C TO TIME D | 2 | 2 |
| | TIME D TO TIME E | 0 | 0 |
| | TIME E TO TIME A | 4 | 2 |
| ... | ... | ... | ... |

FIG. 8

| DAY | TIME PERIOD | OPERATION MODE | TOTAL EXECUTION TIME [MIN] | NUMBER OF EXECUTIONS |
|---|---|---|---|---|
| MON | TIME A TO TIME B | FAX MODE | 5 | 2 |
| | | OTHER MODE | 20 | 6 |
| | TIME C TO TIME D | FAX MODE | 3 | 1 |
| | | OTHER MODE | 30 | 5 |
| | TIME D TO TIME E | FAX MODE | 7 | 3 |
| | | OTHER MODE | 15 | 4 |
| | ... | ... | ... | ... |
| ... | ... | ... | ... | ... |

FIG. 11

| MODE | WEEK | TIME | CAPACITOR | |
|---|---|---|---|---|
| | | | ON | OFF |
| COPY | MON | TIME A TO TIME B | ○ | − |
| | | LEARNING RESULT | ○ | − |
| | TUE | TIME C TO TIME D | − | ○ |
| | | LEARNING RESULT | − | ○ |
| | WED | TIME E TO TIME A | − | ○ |
| | | LEARNING RESULT | ○ | − |
| | THU | TIME B TO TIME C | ○ | − |
| | | LEARNING RESULT | − | ○ |
| | FRI | TIME D TO TIME E | − | ○ |
| | | LEARNING RESULT | − | ○ |
| FAX | MON | TIME A TO TIME B | − | ○ |
| | | LEARNING RESULT | − | ○ |
| | TUE | TIME C TO TIME D | − | ○ |
| | | LEARNING RESULT | − | ○ |
| . | . | . | . | . |
| | . | . | . | . |
| . | . | . | . | . |

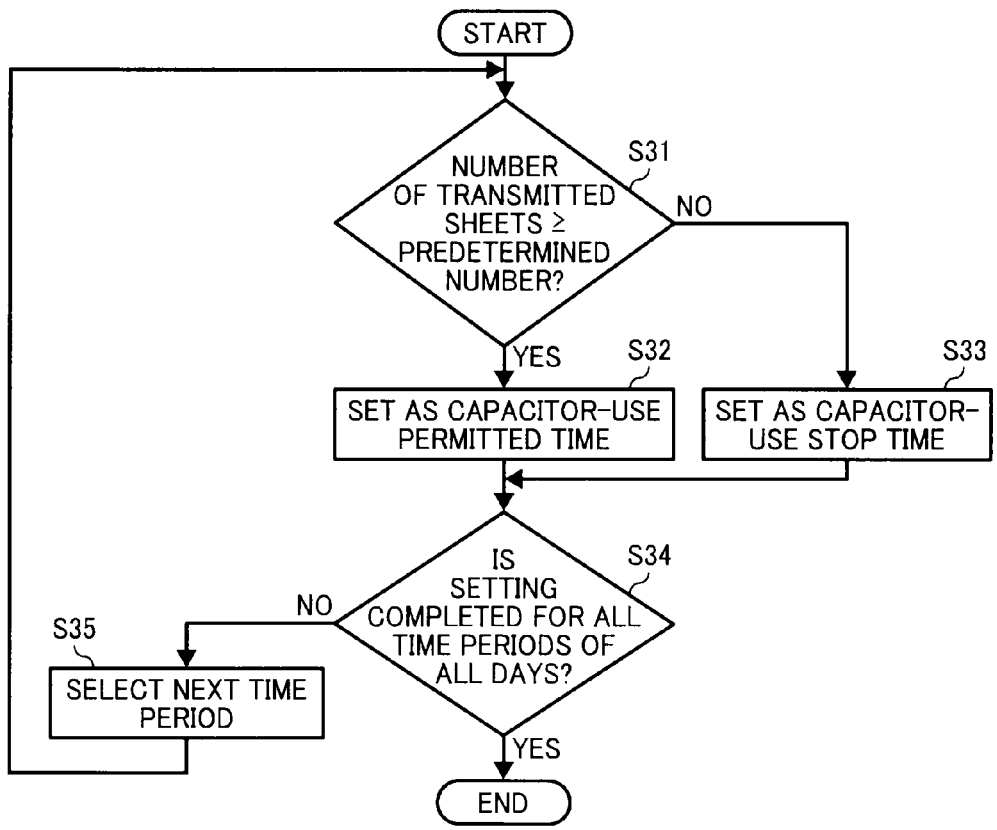

| DAY | TIME PERIOD | TOTAL USE TIME OF CAPACITOR [MIN] |
|---|---|---|
| MON | TIME A TO TIME B | 28 |
| | TIME C TO TIME D | 4 |
| | TIME D TO TIME E | 3 |
| | TIME E TO TIME A | 5 |
| TUE | TIME A TO TIME B | 7 |
| | TIME C TO TIME D | 3 |
| | TIME D TO TIME E | 0 |
| | TIME E TO TIME A | 3 |
| ... | ... | ... |

| MODE | CAPACITOR | |
| --- | --- | --- |
| | ON | OFF |
| COPY | ○ | — |
| PRINTER | ○ | — |
| SCANNER | — | ○ |
| FAX | — | ○ |
| . | . | . |

IMAGE FORMING APPARATUS AND POWER-SUPPLY CONTROL METHOD

CROSS-REFERENCE TO RELATED APPLICATIONS

The present application claims priority to and incorporates by reference the entire contents of Japanese Patent Application No. 2008-199827 filed in Japan on Aug. 1, 2008 and Japanese Patent Application No. 2009-164930 filed in Japan on Jul. 13, 2009.

BACKGROUND OF THE INVENTION

1. Field of the Invention

The present invention relates to a technology for controlling a power supply in an image forming apparatus.

2. Description of the Related Art

It is known that, in an image forming apparatus, when loads of the image forming apparatus consume a large amount of power for activating the image forming apparatus, executing various processes such as a copy process, or the like, sufficient power cannot be supplied to the loads from only a commercial power source used as a main power source of the image forming apparatus. To overcome such a problem, there has been proposed a technology for compensating for lack of power supplied from the commercial power source by installing a capacitor as an auxiliary power source in the image forming apparatus such that power can be supplied from the capacitor to the loads when the loads consume a large amount of power. However, in the technology for compensating for the lack of the power supplied from the commercial power source by using the capacitor when the loads consume a large amount of power, the capacitor is frequently caused to charge and discharge, resulting in shortening a lifetime of the capacitor.

An image forming apparatus that includes a heating device having a measure against such a problem is disclosed in, for example, Japanese Patent Application Laid-open No. 2005-166633. Specifically, the heating device determines whether to use a capacitor based on an amount of power supplied from a commercial power source and a temperature of a heater heated by the power supplied from the commercial power source. More particularly, the heating device causes the capacitor to supply power for heating the heater only when the temperature of the heater is lower than a value while the largest amount of power for heating the heater is supplied from the commercial power source.

However, in the technology disclosed in Japanese Patent Application Laid-open No. 2005-166633, when the image forming apparatus is being warmed up, the temperature of the heater is often maintained lower than the value even when the largest amount of power for heating the heater is supplied from the commercial power source. Accordingly, the capacitor is often caused to supply power to the heater. Thus, when the image forming apparatus is activated or warmed up for recovering from an energy-saving mode or the like, the capacitor is almost always caused to supply power to the heater. Therefore, the number of times of charge and discharge of the capacitor increases, resulting in shortening the lifetime of the capacitor.

SUMMARY OF THE INVENTION

It is an object of the present invention to at least partially solve the problems in the conventional technology.

According to one aspect of the present invention, there is provided an image forming apparatus including a charge storage unit capable of charging and discharging; a charging unit that charges the charge storage unit with a power from a power source; a discharging unit that discharges the charge storage unit and supplies a discharge power to a load; a detecting unit that detects a usage state of the charge storage unit for each predetermined time period; a setting unit that determines whether the usage state of the charge storage unit satisfies a predetermined condition for each time period, and when it is determined that the usage state satisfies the predetermined condition, sets a corresponding time period as a charge-use permitted time; and a control unit that determines whether a current time falls in the charge-use permitted time, and when it is determined that the current time falls in the charge-use permitted time, allows the discharging unit to discharge the charge storage unit.

Furthermore, according to another aspect of the present invention, there is provided a method of controlling a power supply in an image forming apparatus that includes a charge storage unit capable of charging and discharging. The method includes charging the charge storage unit with a power from a power source; discharging including charging the charge storage unit, and supplying a discharge power to a load; detecting a usage state of the charge storage unit for each predetermined time period; setting including determining whether the usage state of the charge storage unit satisfies a predetermined condition for each time period, and setting, when it is determined that the usage state satisfies the predetermined condition, a corresponding time period as a charge-use permitted time; and controlling including determining whether a current time falls in the charge-use permitted time, and allowing, when it is determined that the current time falls in the charge-use permitted time, the discharging to discharge the charge storage unit.

Moreover, according to still another aspect of the present invention, there is provided a computer program product including a computer-usable medium having computer-readable program codes embodied in the medium for controlling a power supply in an image forming apparatus that includes a charge storage unit capable of charging and discharging. The program codes when executed causing a computer to execute charging the charge storage unit with a power from a power source; discharging including charging the charge storage unit, and supplying a discharge power to a load; detecting a usage state of the charge storage unit for each predetermined time period; setting including determining whether the usage state of the charge storage unit satisfies a predetermined condition for each time period, and setting, when it is determined that the usage state satisfies the predetermined condition, a corresponding time period as a charge-use permitted time; and controlling including determining whether a current time falls in the charge-use permitted time, and allowing, when it is determined that the current time falls in the charge-use permitted time, the discharging to discharge the charge storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 illustrates a table containing a capacitor-use permitted time set for each day of a week;

FIG. 7 is an example of contents of a first learning-result table according to a second embodiment of the present invention;

FIG. 8 is an example of contents of a second learning-result table according to the second embodiment;

FIG. 11 illustrates a table used for setting a capacitor-use permitted time according to a first modified example of the second embodiment;

FIG. 14 is an example of contents of a learning-result table according to a third embodiment of the present invention;

FIG. 15 is a flowchart of a process of setting a capacitor-use permitted time according to the third embodiment;

DETAILED DESCRIPTION OF THE PREFERRED EMBODIMENTS

Exemplary embodiments of the present invention are explained in detail below with reference to the accompanying drawings. In the description of the following embodiments, examples will be used in which an image forming apparatus according to the present invention is applied to a multifunction peripheral (MFP). However, the present invention is not limited to the MFP and can be applied to other apparatuses such as a digital copier, a printer, a facsimile (FAX) machine, a scanner, or an apparatus that performs image forming processing by using a copy function, a FAX function, or a printer function.

The MFP according to the following embodiments is assumed as an image forming apparatus including a digital copier. In other words, the MFP has a copy function and other functions such as a printer function and a FAX function, and allows a user to select one of the copy function, the printer function, and the FAX function by switching over the functions from one to the other through operation of an application switch key (not shown) of an operating unit (not shown) of the MFP. The MFP enters a copy mode when the copy function is selected, enters a printer mode when the printer function is selected, and enters a FAX mode when the FAX function is selected.

Figure 1:
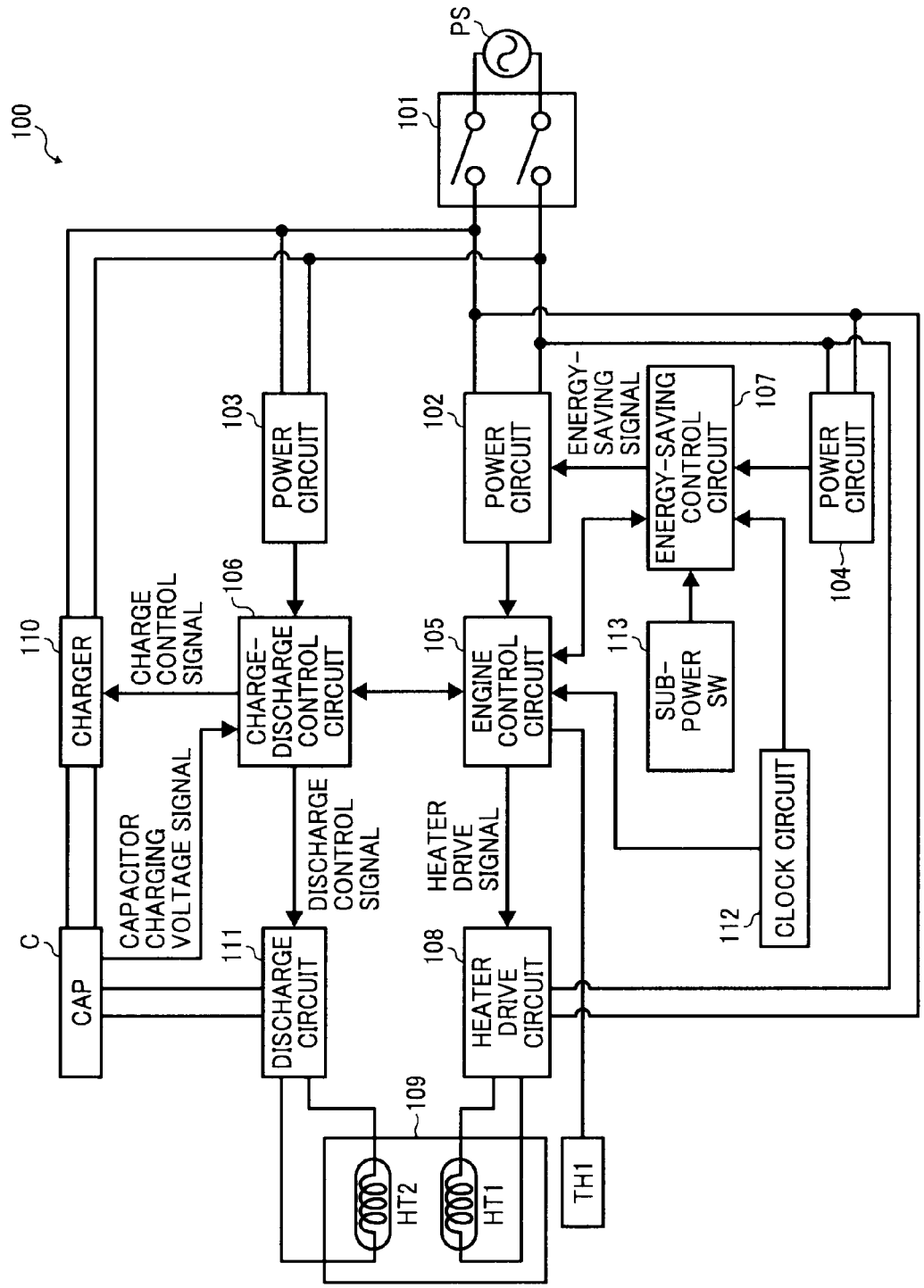
FIG. 1 is a circuit diagram of a control circuit that controls heating of a fixing heater of a fixing roller included in a multifunction peripheral (MFP) according to a first embodiment of the present invention.

FIG. 1 is a circuit diagram of a control circuit 100 that controls heating of fixing heaters HT1 and HT2 of a fixing roller 109 included in an MFP according to a first embodiment of the present invention. The control circuit 100 includes an alternating-current (AC) power source (a commercial AC power source) PS, a main power source switch (SW) 101, power circuits 102, 103, and 104, an engine control circuit 105, a charge-discharge control circuit 106, an energy-saving control circuit 107, a heater drive circuit 108, the fixing roller 109, a charger 110, a capacitor C, a discharge circuit 111, a clock circuit 112, a sub power SW 113, the fixing heaters HT1 and HT2, and a temperature sensor TH1.

The main power source SW 101 controls ON and OFF of power supply from the AC power source PS. Specifically, when the main power source SW 101 is ON, power is supplied from the AC power source PS to each of the power circuits 102, 103, and 104, so that each of the power circuits 102, 103, and 104 generates power that is necessary for controlling the fixing roller 109. More particularly, the power circuit 102 supplies power to most of electric loads in the MFP, such as the engine control circuit 105 and a printer engine. The power circuit 103 supplies power to the charge-discharge control circuit 106. The power circuit 104 supplies power to the energy-saving control circuit 107.

The clock circuit 112 counts time, and outputs data of the counted time to each of the engine control circuit 105 and the energy-saving control circuit 107. The sub power SW 113 receives, from a user, an instruction for switching a mode of the MFP to an energy-saving mode.

The energy-saving control circuit 107 controls switching of the mode of the MFP based on outputs from the clock circuit 112 and the sub power SW 113. In the first embodiment, the mode of the MFP can be a normal mode and the energy-saving mode.

The normal mode and the energy-saving mode are state modes used for changing operation states of each of the fixing roller 109 and other electric loads. More particularly, the normal mode is a mode in which the fixing roller 109 is enabled to operate immediately upon receiving an operation instruction. The energy-saving mode is a mode in which power is supplied only to the printer engine including the fixing roller 109 and some of the electric loads and is not supplied to the rest of the electric loads (e.g., a scanner) that are used only for image formation.

The energy-saving control circuit 107 communicates with the engine control circuit 105. Therefore, the state of the MFP is sent to the engine control circuit 105.

The energy-saving control circuit 107 outputs, in the energy-saving mode, an energy-saving signal to the power circuit 102. When receiving the energy-saving signal, the power circuit 102 stops supplying power to the engine control circuit 105 and the like. When not receiving the energy-saving signal, the power circuit 102 continuously supplies power to the engine control circuit 105 and the like.

Even when the power circuit 102 stops supplying power, the power circuits 103 and 104 continue supply of power. In other words, the charger 110, the charge-discharge control circuit 106, the sub power SW 113, and the energy-saving control circuit 107 are supplied with power even when the power circuit 102 stops supplying power.

Thus, even when the MFP enters the energy-saving mode and thereby the power circuit 102 turns OFF, the energy-saving control circuit 107 can continuously be supplied with power from the power circuit 104. The power circuit 102 can be resumed by stopping output of the energy-saving signal. The charge-discharge control circuit 106 is enabled to charge the capacitor C according to a voltage signal output from the capacitor C even when the power circuit 102 is OFF.

The engine control circuit 105 includes a microcomputer, and controls the printer engine including the fixing roller 109 and the other electric loads by using the microcomputer. More particularly, the engine control circuit 105 outputs a heater drive signal to the heater drive circuit 108. The heater drive signal is used for instructing the heater drive circuit 108 to turn ON or turn OFF. More particularly, the heater drive signal is used for instructing the heater drive circuit 108 to turn ON or turn OFF based on a temperature of the fixing roller 109, which is detected by the temperature sensor TH1.

The engine control circuit 105 communicates with the charge-discharge control circuit 106. Specifically, the engine control circuit 105 sends an instruction for controlling the charger 110 and the discharge circuit 111 to the charge-discharge control circuit 106 based on the output from the clock circuit 112.

The heater drive circuit 108 electrifies the fixing heater HT1 based on the heater drive signal output from the engine control circuit 105. The heater drive circuit 108 is supplied with power from the AC power source PS via the main power source SW 101.

The charger 110 is supplied with power from the AC power source PS via the main power source SW 101. The capacitor C is charged by the charger 110. In the first embodiment, the capacitor C can be a charge storage unit capable of charging and discharging. The capacitor C can be a lithium-ion capacitor, a lithium-ion battery, a nickel-hydrogen battery, an electric double layer capacitor, a secondary battery, or the like.

The discharge circuit 111 discharges charge stored in the capacitor C to supply power to the fixing heater HT2 and the other electric loads (e.g., a motor and a scanner). Accordingly, the fixing heater HT2 is heated by the power supplied by the discharge circuit 111. By causing the discharge circuit 111 to discharge charge stored in the capacitor C to supply the power to the other electric loads, it is possible to increase the amount of power supplied from the AC power source PS to the fixing heater HT1.

The charge-discharge control circuit 106 includes a microcomputer, and controls the charger 110 and the discharge circuit 111 by using the microcomputer. More particularly, the charge-discharge control circuit 106 outputs a charge control signal to the charger 110. The charge control signal indicates either a charge instruction or a charge stop instruction. When receiving the charge control signal indicating the charge instruction, the charger 110 charges the capacitor C. The charge-discharge control circuit 106 also outputs a discharge control signal to the discharge circuit 111. The discharge control signal indicates either a discharge instruction or a discharge stop instruction. When receiving the discharge control signal indicating the discharge instruction, the discharge circuit 111 discharges charge from the capacitor C.

The charge-discharge control circuit 106 controls the charger 110 and the discharge circuit 111 based on an instruction from the engine control circuit 105. Furthermore, the charge-discharge control circuit 106 acquires, from the capacitor C, a capacitor charging voltage signal indicating a voltage of the capacitor C, and controls the charger 110 and the discharge circuit 111 based on the capacitor charging voltage signal.

Figure 2:
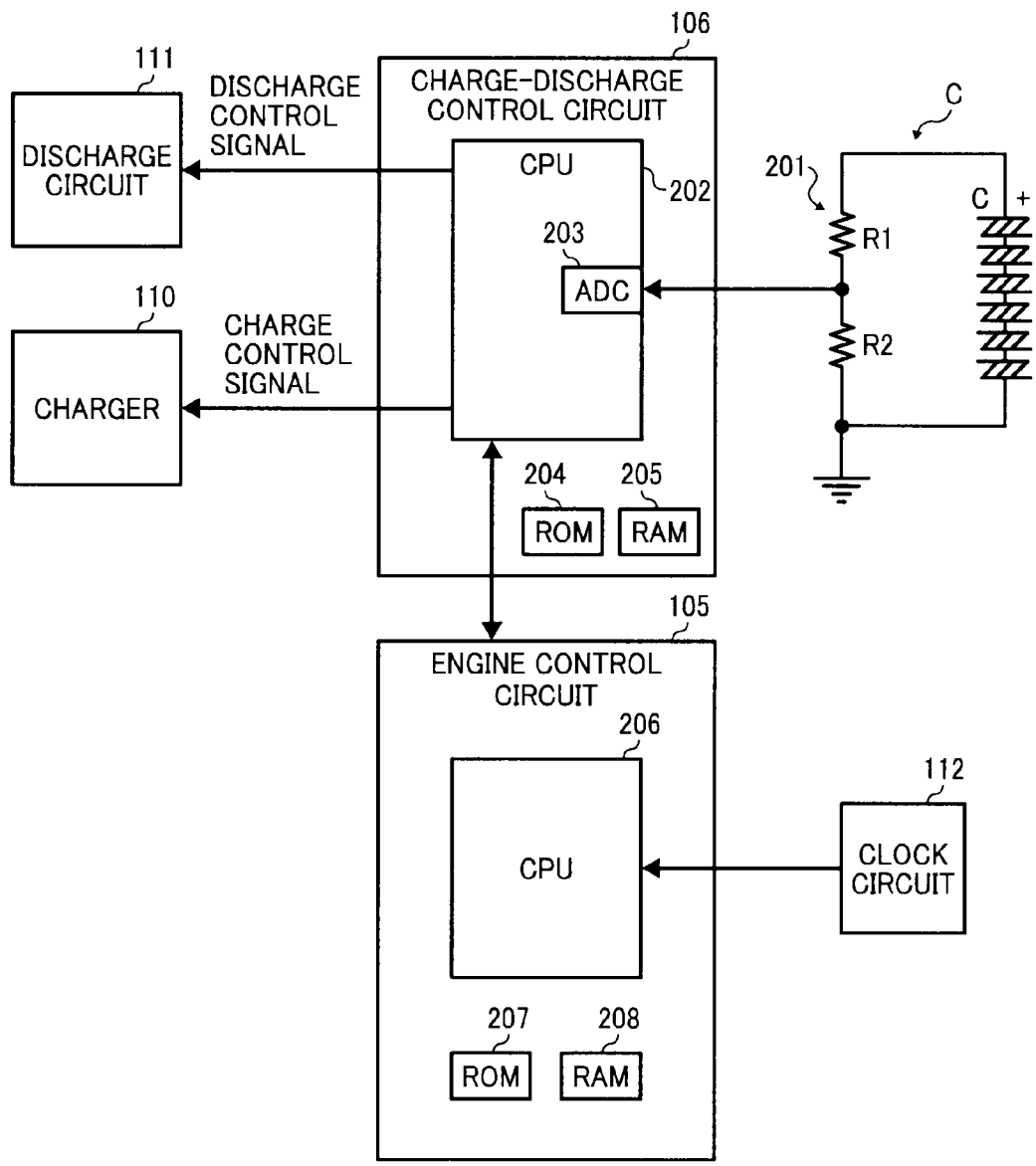
FIG. 2 is a schematic diagram of detailed configurations of a capacitor, an engine control circuit and a charge-discharge control circuit shown in FIG. 1.

FIG. 2 is a schematic diagram of detailed configurations of the capacitor C, the engine control circuit 105, and the charge-discharge control circuit 106. The capacitor C includes a voltage sensor 201 that divides a charging voltage of the capacitor C by resistances R1 and R2, and outputs the divided voltage as a detection signal.

As shown in FIG. 2, the engine control circuit 105 includes a central processing unit (CPU) 202, and the charge-discharge control circuit 106 includes a CPU 206. Each of the CPUs 202 and 206 functions as a main unit of the MFP and centrally controls various units of the MFP. The CPUs 202 and 206 include read only memories (ROMs) 204 and 207 and random access memories (RAMs) 205 and 208, respectively, which are connected to one another via a bus (not shown). Each of the ROMs 204 and 207 stores therein BIOS and the like. Each of the RAMs 205 and 208 stores therein various data in a rewritable manner.

Because the RAMs 205 and 208 can store therein various data in a rewritable manner, they are used as work areas and buffers by the CPUs 202 and 206, respectively.

The RAM 208 also stores therein a capacitor-use permitted time in which discharge of the capacitor C is permitted. More particularly, in the first embodiment, the RAM 208 stores therein a table containing the capacitor-use permitted time set for each day of a week. FIG. 3 illustrates the table containing the capacitor-use permitted time set for each day of a week. In the table shown in FIG. 3, ON or OFF of the capacitor C is set for each of predetermined time periods of each day of a week (i.e., time A to time B, time B to time C, time C to time D, time D to time E, and time E to time A). Specifically, time periods corresponding to circles on a column of "ON" of an item "capacitor" are set as the capacitor-use permitted time. On the other hand, time periods corresponding to circles on a column of "OFF" of the item "capacitor" are set as a capacitor-use stop time in which discharge of the capacitor C is stopped. In the first embodiment, a daytime (i.e., time A to time B and time B to time C) of each day of a week is set as the capacitor-use permitted time.

The ROMs 204 and 207 function as storage media for storing various computer programs and data. More particularly, the ROMs 204 and 207 store therein computer programs used for controlling the MFP by the CPUs 202 and 206, respectively.

Each of the CPUs 202 and 206 that control an entire system of the MFP executes various processing based on the computer programs stored in corresponding one of the ROMs 204 and 207 that function as main storage units of the system.

Processing performed by the CPUs 202 and 206 based on the computer programs stored in the ROMs 204 and 207, respectively, is briefly described below.

The detection signal output from the voltage sensor 201 is input to an analog-to-digital converter (ADC) 203 installed in the CPU 202. The CPU 202 acquires a current amount of charge based on a result of conversion performed by the ADC 203, and compares the acquired amount of charge with either a discharge target value or a charge target value, which is set in advance. Then, the CPU 202 determines whether to perform charge or discharge of the capacitor C or whether to stop charge and discharge of the capacitor C, based on a result of the comparison and the instruction from the engine control circuit 105. The discharge target value is a predetermined voltage value of the capacitor C, which is to be obtained after discharge of the capacitor C is completed. The charge target value is a predetermined voltage value of the capacitor C, which is to be obtained after charge of the capacitor C is completed. The CPU 206 sends an instruction for controlling the charger 110 and the discharge circuit 111 to the charge-discharge control circuit 106 based on the output from the clock circuit 112.

Figure 4:
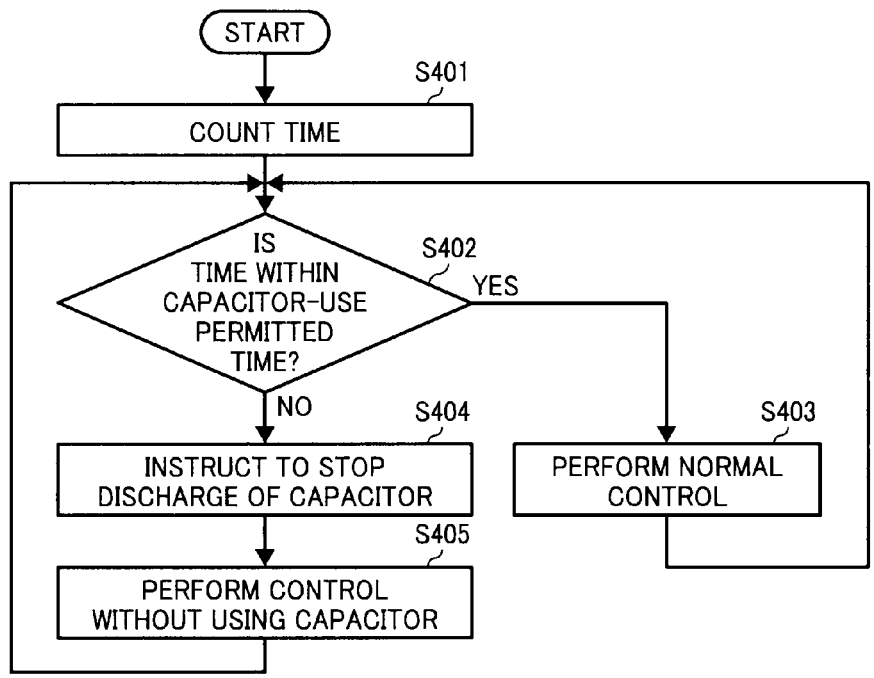
FIG. 4 is a flowchart of a process of controlling the capacitor by the engine control circuit and the charge-discharge control circuit.

Salient features of the functions of the engine control circuit 105 and the charge-discharge control circuit 106 are described in detail below from among functions implemented by causing the CPU 202 to execute the computer programs stored in the ROM 204 of the engine control circuit 105 and causing the CPU 206 to execute the computer programs stored in the ROM 207 of the charge-discharge control circuit 106. FIG. 4 is a flowchart of a process of controlling the capacitor C by the engine control circuit 105 and the charge-discharge control circuit 106.

The CPU 206 causes the clock circuit 112 to count time as a determination object for which whether discharge of the capacitor C is permitted is determined (Step S401). The CPU 206 determines, at every predetermined time interval or when the MFP receives a job according to operation of the operating unit (not shown), whether the time counted by the clock circuit 112 is within the capacitor-use permitted time that is set as a permission condition for permitting the discharge of the capacitor C (Step S402). Thus, the CPU 206 determines whether the determination object, for which whether the discharge of the capacitor C is permitted is determined, satisfies the permission condition for permitting the discharge of the capacitor C.

For example, in the first embodiment, the CPU 206 determines that, when the time counted by the clock circuit 112 is within the time period from time A to time C shown in FIG. 3, the time counted by the clock circuit 112 is within the capacitor-use permitted time. On the other hand, the CPU 206 determines that, when the time counted by the clock circuit 112 is within the time period from time C to time A shown in FIG. 3, the time counted by the clock circuit 112 is within the capacitor-use stop time. If the time counted by the clock circuit 112 is within the capacitor-use permitted time, the CPU 206 sends, to the CPU 202, an instruction for permitting the discharge circuit 111 to discharge charge from the capacitor C.

While, in the first embodiment, it is assumed that the table shown in FIG. 3 is stored in the RAM 208 in advance, the present invention is not limited to this example. For example, the CPU 206 can be configured to receive the capacitor-use permitted time from the operating unit (not shown) or an external personal computer (PC) via a network, and to update the table shown in FIG. 3, which is stored in the RAM 208, with the received capacitor-use permitted time. In this case, the CPU 206 determines whether the time counted by the clock circuit 112 is within the received capacitor-use permitted time. With this configuration, a user is allowed to change the capacitor-use permitted time as appropriate depending on a situation where the user needs to perform printing at a fast processing speed even in a nighttime and on holidays (i.e., during the capacitor-use stop time).

Only when the instruction for permitting the discharge circuit 111 to discharge charge from the capacitor C is sent to the CPU 202, i.e., when it is determined that the determination object satisfies the permission condition, i.e., when it is determined that the time counted by the clock circuit 112 is within the capacitor-use permitted time (YES at Step S402), the CPU 202 permits the discharge of the capacitor C, and performs normal control (Step S403). In the first embodiment, only when determining that the time counted by the clock circuit 112 is within the capacitor-use permitted time, the CPU 206 outputs the charge control signal indicating the charge instruction to the charger 110, and also outputs the discharge control signal indicating the discharge instruction to the discharge circuit 111. As a result, the capacitor C is permitted to charge and discharge only within the capacitor-use permitted time, that is, the capacitor C is used only within the capacitor-use permitted time.

On the other hand, when it is determined that the time counted by the clock circuit 112 is out of the capacitor-use permitted time, i.e., when it is determined that the time counted by the clock circuit 112 is within the capacitor-use stop time (NO at Step S402), the CPU 206 sends, to the CPU 202, an instruction for stopping the discharge circuit 111 from discharging charge from the capacitor C (Step S404). Upon receiving the instruction for stopping the discharge circuit 111 from discharging charge from the capacitor C, the CPU 202 stops the discharge of the capacitor C, and performs control without using the capacitor C (Step S405). In the first embodiment, the CPU 202 outputs the discharge control signal indicating the discharge stop instruction to the discharge circuit 111 upon receiving, from the CPU 206, the instruction for stopping the discharge of the capacitor C.

Figure 5:
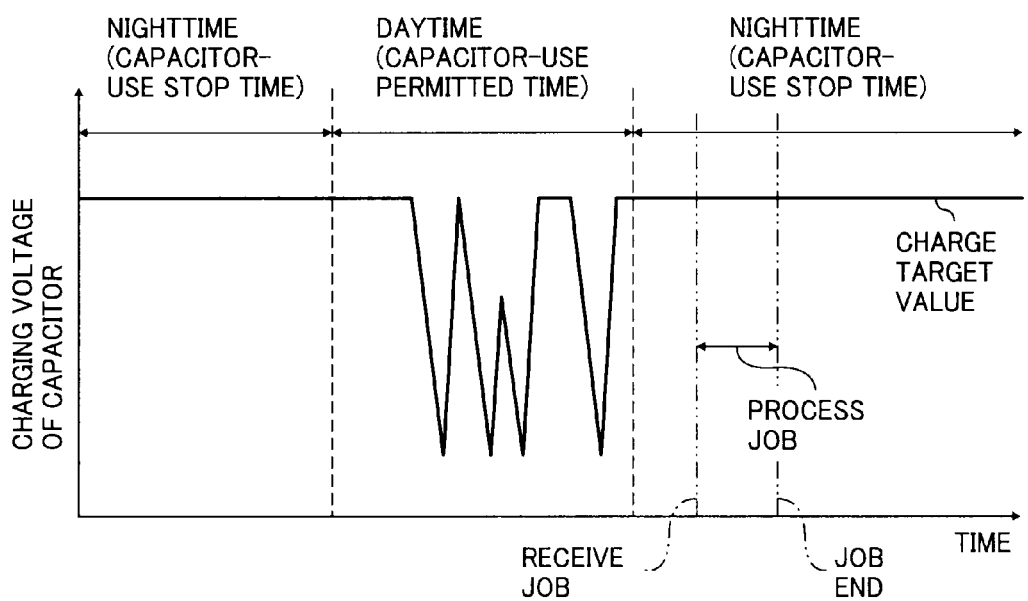
FIG. 5 is a graph of a voltage of the capacitor controlled by the engine control circuit and the charge-discharge control circuit.
Figure 6:
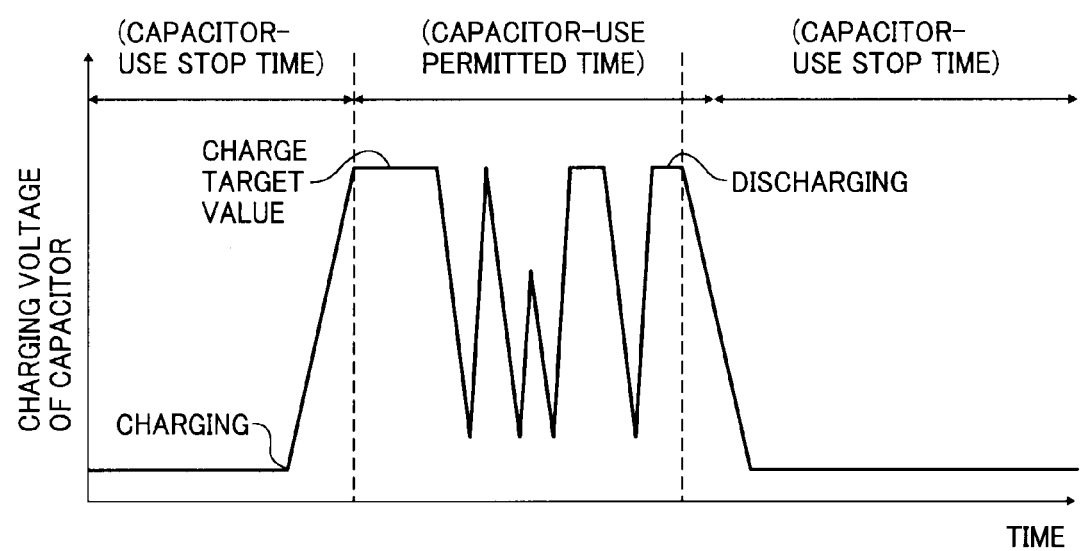
FIG. 6 is a graph of a voltage of the capacitor controlled by the engine control circuit and the charge-discharge control circuit.

FIGS. 5 and 6 are graphs of voltages of the capacitor C controlled by the engine control circuit 105 and the charge-discharge control circuit 106. As shown in FIG. 5, discharge of the capacitor C is stopped during the nighttime (i.e., the capacitor-use stop time), so that the charging voltage of the capacitor C is maintained at the charge target value. Therefore, when the MFP receives a job during the nighttime, power is supplied to the electric loads of the MFP without using electrical energy stored in the capacitor C. More particularly, the MFP is mainly caused to perform printing of data sent from a FAX machine or an external PC connected to the MFP via a network during the nighttime and on holidays (i.e., during the capacitor-use stop time). In such a situation, the MFP generally need not perform the printing at a fast processing speed. Therefore, even when the MFP is activated or the temperature of the fixing heater HT1 decreases during the capacitor-use stop time, charge is not discharged from the capacitor C. On the other hand, because the capacitor C is permitted to discharge during the daytime (i.e., during the capacitor-use permitted time), the charging voltage of the capacitor C repeatedly increases and decreases according to the discharge of the capacitor C by the discharge circuit 111.

While, in the example shown in FIG. 5, the charging voltage of the capacitor C during the capacitor-use stop time is maintained at the charge target value, the present invention is not limited to this example. Because the lifetime of the capacitor C depends on a voltage at the time of using the capacitor C, the charging voltage of the capacitor C is preferably maintained at a predetermined value or smaller during the capacitor-use stop time. For example, as shown in FIG. 6, the charge target value of the capacitor C in the capacitor-use stop time can be set to about a half of the charge target value in the capacitor-use permitted time or even to zero. Accordingly, the charging voltage of the capacitor C can be reduced during a time other than a required time (i.e., the capacitor-use permitted time), so that the lifetime of the capacitor C can be lengthened.

More particularly, the CPU 206 sends, to the CPU 202, before the time counted by the clock circuit 112 reaches a time at which the capacitor-use permitted time stored in the RAM 208 ends (or at which the capacitor-use permitted time starts), an instruction for permitting the charger 110 to charge the capacitor C. The CPU 206 also sends, to the CPU 202, an instruction for permitting the charger 110 to charge the capacitor C to increase the charging voltage of the capacitor C to the charge target value before the capacitor-use permitted time starts. The time taken for charging the capacitor C can be obtained by using commonly-known techniques, and therefore, detailed explanation thereof is omitted. Upon receiving the instruction for permitting the charge of the capacitor C, the CPU 202 outputs the charge control signal indicating the charge instruction to the charger 110 before the capacitor-use permitted time starts to permit the charger 110 to charge the capacitor C.

Furthermore, the CPU 206 sends, to the CPU 202, before the time counted by the clock circuit 112 reaches a time at which the capacitor-use permitted time stored in the RAM 208 starts (or at which the capacitor-use permitted time ends), an instruction for permitting the discharge circuit 111 to discharge charge from the capacitor C. Upon receiving the instruction for permitting the discharge of the capacitor C, and if the charging voltage of the capacitor C, which is indicated by the capacitor charging voltage signal, is at a predetermined value or larger when the capacitor-use permitted time ends, the CPU 202 outputs the discharge control signal indicating the discharge instruction to the discharge circuit 111 to permit the discharge of the capacitor C. Accordingly, charge is mandatorily discharged from the capacitor C to the fixing heater HT2 after the capacitor-use permitted time ends. Thus, the power stored in the capacitor C can be dissipated during the time other than the capacitor-use permitted time. As a result, the lifetime of the capacitor C can be lengthened.

In the above process, the CPU 202 controls the discharge of the capacitor C by reference to the temperature of the fixing heater HT2. When the charging voltage of the capacitor C, which is indicated by the capacitor charging voltage signal, is at the predetermined value or smaller as a result of copying or printing performed just before the capacitor-use stop time starts, the CPU 202 outputs the charge control signal indicating the charge stop instruction to the charger 110. While, in the first embodiment, charge is discharged from the capacitor C to the fixing heater HT2, the present invention is not limited to this example. It is applicable to discharge charge from the capacitor C to the electric loads other than the fixing heater HT2.

In this manner, in the MFP according to the first embodiment, the CPU 206 determines whether the time counted by the clock circuit 112 is within the capacitor-use permitted time, and the CPU 202 permits the discharge of the capacitor C only when it is determined that the time counted by the clock circuit 112 is within the capacitor-use permitted time. Therefore, it is possible to stop the discharge of the capacitor C when the MFP need not perform processing at a fast processing speed, e.g., during the nighttime. Accordingly, unnecessary charge and unnecessary discharge of the capacitor C can be reduced, resulting in lengthening the lifetime of the capacitor C.

A second embodiment of the present invention is described in detail below. An MFP according to the second embodiment determines a usage state of the capacitor C based on the number of executions of each of the operation modes, such as a copy mode, a printer mode, and a FAX mode, and a total execution time of each of the operation modes to set the capacitor-use permitted time. Accordingly, charge and discharge of the capacitor C can be controlled depending on user's usage, leading to reduction of unnecessary charge and unnecessary discharge of the capacitor C without decreasing user's usability of the MFP. The configuration of the MFP and the functional configurations implemented by the engine control circuit 105 and the charge-discharge control circuit 106 are the substantially same as those described in the first embodiment, and therefore, only processing different from that of the first embodiment is described in detail below.

The copy mode is an operation mode in which a copy process is performed. In the copy mode, the fixing heater HT2 is used, so that it is preferable to use electrical energy stored in the capacitor C. In other words, in the copy mode, it is preferable to perform the copy process by heating the fixing heater HT2 by using the electrical energy released by the capacitor C.

The printer mode is an operation mode in which a printing process is performed. In the printing mode, it is preferable to perform the printing process by heating the fixing heater HT2 by using the electrical energy released by the capacitor C.

The FAX mode is an operation mode in which a FAX transmission process and a FAX reception process are performed. In the FAX mode, the fixing heater HT2 is not used, so that it is not necessary to use the electrical energy released by the capacitor C.

When the MFP operates in each of the operation modes, information about the operation mode being used and an execution time of the operation mode are stored in a memory including the RAM 208. In the second embodiment, the execution time of each of the operation modes in each of predetermined time periods is acquired from the RAM 208 to obtain the total execution time of each of the operation modes in each of predetermined time periods. Besides, the number of executions of each of the operation modes in each of the time periods is counted.

While each of the operation modes includes detailed operation modes, the second embodiment is described with reference to only the copy mode, the printer mode, and the FAX mode. The detailed operation modes will be described later in modified examples of the second embodiment.

The CPU 206 reads, from the RAM 208, the execution time during which each of the operation modes of the MFP has been executed in each of the time periods, and calculates the total execution time of each of the operation modes in each of the time periods. The CPU 206 also counts the number of executions of each of the operation modes of the MFP in each of the time periods. More particularly, in the second embodiment, the CPU 206 counts the total execution time and the number of executions of each of the operation modes of the MFP in each of the time periods of each day of a week. The total execution time and the number of executions of each of the operation modes of the MFP are stored as a first learning-result table in the RAM 208. FIG. 7 is an example of contents of the first learning-result table. In the table shown in FIG. 7, the total execution time and the number of executions of the copy mode are registered for each of the time periods of each day of a week. The total execution time and the number of executions of the other operation modes are also registered in the same manner as shown in FIG. 7.

The CPU 206 determines, by reference to the first learning-result table, whether the total execution time of the operation mode in which the capacitor C needs to be used, that is, the operation mode in which the electrical energy released by the capacitor C needs to be used (e.g., the copy mode and the printer mode), is equal to or longer than a predetermined time in each of the time periods, or whether the number of executions of the same operation mode is equal to or larger than a predetermined number in each of the time periods. Then, the CPU 206 determines the usage state of the capacitor C based on a result of the determination, and sets each of the time periods as either the capacitor-use permitted time or the capacitor-use stop time in the RAM 208 based on the usage state of the capacitor C. A process of setting the capacitor-use permitted time and the capacitor-use stop time will be described in detail later.

In the second embodiment, the CPU 206 also calculates the total execution time of the FAX mode, as the operation mode in which the capacitor C need not be used, that is, the operation mode in which the electrical energy released by the capacitor C need not be used, for each of the time periods of each day of a week. The CPU 206 also counts the number of executions of the FAX mode in each of the time periods of each day of a week. At the same time, the CPU 206 counts the total execution time of each of the copy mode and the printer mode (hereinafter, collectively referred to as "other mode" as appropriate), as the operation mode in which the capacitor C needs to be used, that is, the operation mode in which the electrical energy released by the capacitor C needs to be used, in each of the time periods of each day of a week. The CPU 206 also counts the number of executions of the other mode in each of the time periods of each day of a week. Then, the CPU 206 stores, as a second learning-result table, the total execution time and the number of executions of each of the FAX mode and the other mode in the RAM 208. FIG. 8 is an example of contents of the second learning-result table.

The CPU 206 determines, by reference to the second learning-result table, whether a ratio of the total execution time of the FAX mode to the total execution time of the other mode in each of the time periods is smaller than a predetermined value, or whether a ratio of the number of executions of the FAX mode to the number of executions of the other mode in each of the time periods is smaller than a predetermined value. Then, the CPU 206 determines the usage state of the capacitor C based on a result of the determination, and sets each of the time periods as either the capacitor-permitted time or the capacitor-use stop time in the RAM 208 based on the usage state of the capacitor C. A process of setting the capacitor-use permitted time and the capacitor-use stop time will be described in detail later.

Figure 9:
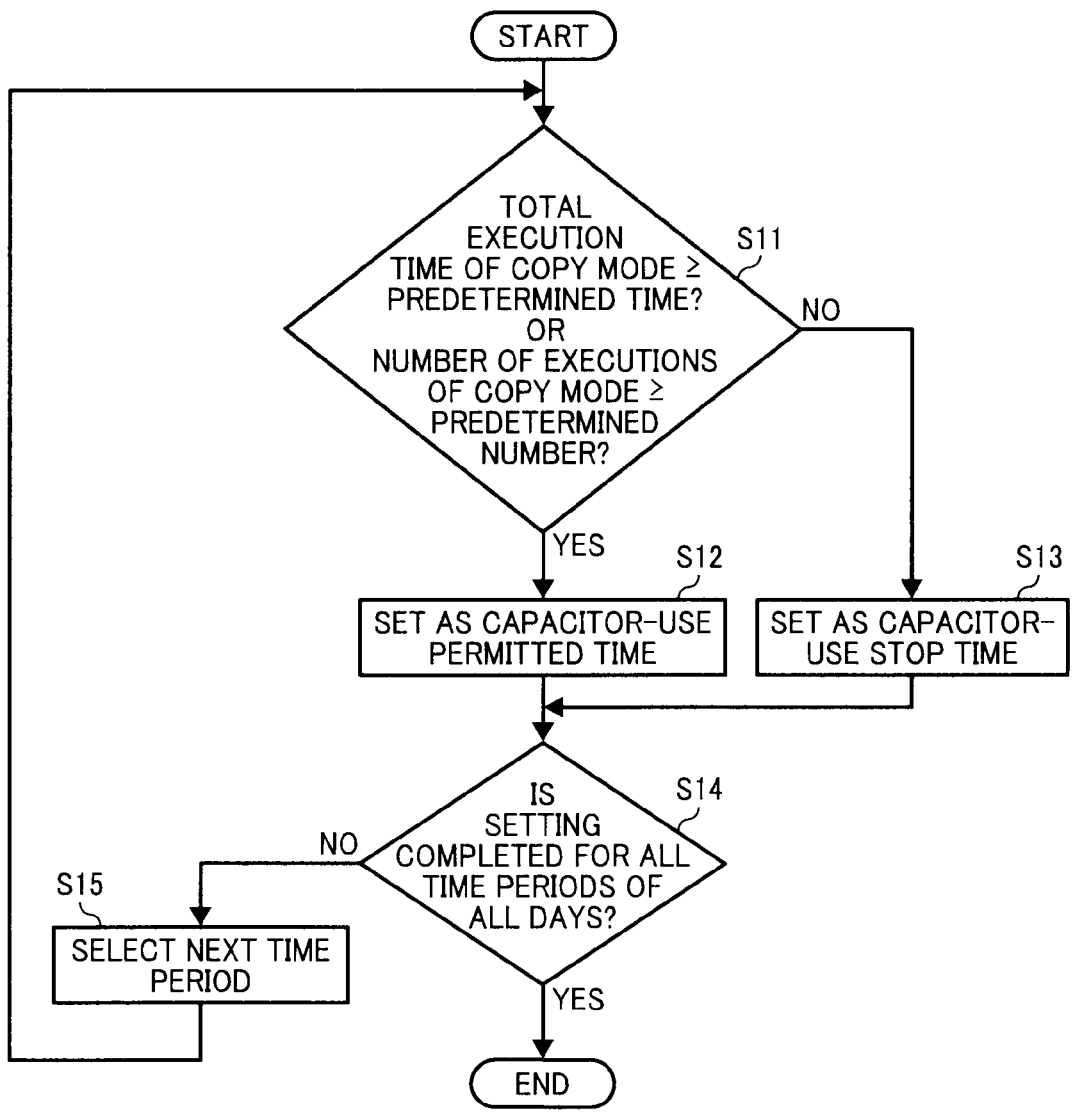
FIG. 9 is a flowchart of a process of setting a capacitor-use permitted time by using the first learning-result table.

The process of setting the capacitor-use permitted time by the MFP having the above configuration according to the second embodiment is described in detail below. FIG. 9 is a flowchart of a process of setting the capacitor-use permitted time by using the first learning-result table shown in FIG. 7. In the example shown in FIG. 9, the copy mode is employed as the operation mode in which the capacitor C needs to be used. However, the same process can be applied to the other operation modes, such as the printer mode, in which the capacitor C needs to be used.

The CPU 206 determines, by reference to the first learning-result table stored in the RAM 208, whether the total execution time of the copy mode in a specific time period is equal to or longer than a predetermined time, or whether the number of executions of the copy mode in the specific time period is equal to or larger than a predetermined number (Step S11). When the total execution time is equal to or longer than the predetermined time or when the number of executions is equal to or larger than the predetermined number (YES at Step S11), the CPU 206 determines that, as the usage state of the capacitor C in the specific time period, an operating time of the capacitor C is long or the number of operating the capacitor C is large, and sets the specific time period as the capacitor-use permitted time in the RAM 208 (Step S12).

On the other hand, at Step S11, when the total execution time of the copy mode is shorter than the predetermined time or the number of executions of the copy mode is smaller than the predetermined number (NO at Step S11), the CPU 206 determines that, as the usage state of the capacitor C in the specific time period, the operating time of the capacitor C is short or the number of operating the capacitor C is small, and sets the specific time period as the capacitor-use stop time in the RAM 208 (Step S13).

Then, the CPU 206 repeats the processes from Step S11 to Step S13 until setting for all time periods of all days registered in the first learning-result table is completed (Step S14).

Figure 10:
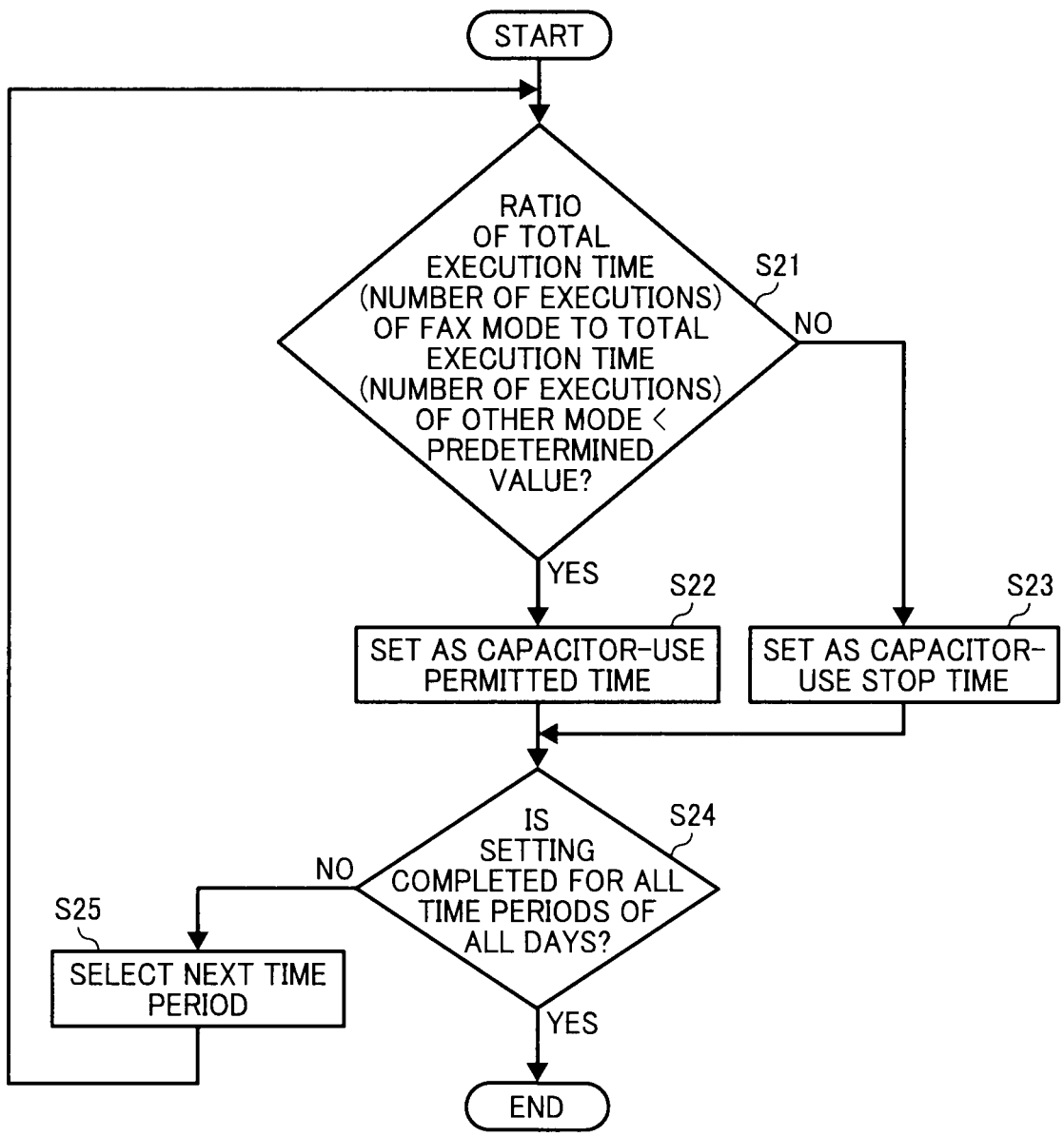
FIG. 10 is a flowchart of a process of setting a capacitor-use permitted time by using the second learning-result table.

FIG. 10 is a flowchart of a process of setting the capacitor-use permitted time by using the second learning-result table shown in FIG. 8. In the example shown in FIG. 10, the FAX mode is employed as the operation mode in which the capacitor C need not be used. However, the same process can be applied to the other operation modes.

The CPU 206 determines, by reference to the second learning-result table stored in the RAM 208, whether a ratio of the total execution time of the FAX mode to the total execution time of the other mode in a specific time period is smaller than a predetermined value, or whether a ratio of the number of executions of the FAX mode to the number of executions of the other mode in the specific time period is smaller than a predetermined number (Step S21). When the ratio of the total execution time of the FAX mode to the total execution time of the other mode in the specific time period is smaller than the predetermined value, or when the ratio of the number of executions of the FAX mode to the number of executions of the other mode is smaller than the predetermined number (YES at Step S21), the CPU 206 determines that, as the usage state of the capacitor C in the specific time period, the operating time of the capacitor C is long or the number of operating the capacitor C is large, and sets the specific time period as the capacitor-use permitted time in the RAM 208 (Step S22).

On the other hand, at Step S21, when the ratio of the total execution time of the FAX mode to the total execution time of the other mode in the specific time period is equal to or larger than the predetermined value, or when the ratio of the number of executions of the FAX mode to the number of executions of the other mode in the specific time period is equal to or larger than the predetermined number (NO at Step S21), the CPU 206 determines that, as the usage state of the capacitor C in the specific time period, the operating time of the capacitor C is short or the number of operating the capacitor C is small, and sets the specific time period as the capacitor-use stop time in the RAM 208 (Step S23).

Then, the CPU 206 repeats the processes from Step S21 to Step S23 until setting for all time periods of all days registered in the second learning-result table is completed (Step S24).

The capacitor-use permitted time and the capacitor-use stop time set through the above processes are stored in the table of FIG. 3, which contains the capacitor-use permitted time for each day of a week, in the same manner as described in the first embodiment.

A process of controlling the capacitor C by using the engine control circuit 105 and the charge-discharge control circuit 106 according to the second embodiment is performed by reference to the table of FIG. 3, which contains the capacitor-use permitted time, in the same manner as the process of controlling the capacitor C as described with reference to FIG. 4 in the first embodiment.

In this manner, in the MFP according to the second embodiment, the capacitor-use permitted time is set depending on the execution state, such as the total execution time or the number of executions, of each of the operation modes of the MFP. Therefore, charge and discharge of the capacitor C can be controlled in accordance with user's usage. Thus, unnecessary charge and unnecessary discharge of the capacitor C can be reduced without decreasing the user's usability. As a result, the lifetime of the capacity C can be lengthened.

A first modified example of the second embodiment is described in detail below. In the first modified example, the capacitor-use permitted time is set depending on the execution state, such as the total execution time or the number of executions, of each of the operation modes of the MFP, and charge and discharge of the capacitor C is controlled based on the setting of the capacitor-use permitted time.

The configuration of the MFP and the functional configurations implemented by the engine control circuit 105 and the charge-discharge control circuit 106 according to the first modified example are the substantially same as those described in the first embodiment, and therefore, only processing different from that of the first embodiment is described in detail below.

In the first modified example, similar to the second embodiment, the total execution time and the number of executions of each of the operation modes of the MFP are counted in each of the time periods of each day of a week.

The CPU 206 sets the capacitor-use permitted time based on a learning result counted in each of the time periods. More particularly, in the first modified example, a specific time period for which a ratio of the learning result of an operation mode, in which the electrical energy released by the capacitor C need not be used, to the learning result of other operation mode is smaller than a predetermined ratio is set as the capacitor-use permitted time.

In the first modified example, the CPU 206 sets the capacitor-use permitted time by using the learning result, which is stored in the RAM 208, of each of the operation modes in each of the time periods of each day of a week. FIG. 11 illustrates a table used for setting the capacitor-use permitted time according to the first modified example. In the first modified example, the table shown in FIG. 11 is stored in the RAM 208, and the CPU 206 sets the capacitor-use permitted time by referring to, from the RAM 208, the table shown in FIG. 11. In the table shown in FIG. 11, time periods corresponding to circles on a column of "ON" of an item "capacitor" in rows representing time periods (e.g., time A to time B) are regarded as candidates that can be set as the capacitor-use permitted time. Furthermore, in the table shown in FIG. 11, time periods corresponding to circles on the column of "ON" of the item "capacitor" in rows representing learning results are regarded as the time periods in which the learning results exceed corresponding values. The CPU 206 sets, from the table shown in FIG. 11, the time period corresponding to the circles on the column of "ON" of the item "capacitor" in both the rows representing the time period and the learning result as the capacitor-use permitted time.

For example, for a specific time period (i.e., time A to time B) of Monday for the copy mode, the circles are set on the column of "ON" of the item "capacitor" in both the rows representing the time period and the learning result. Therefore, the CPU 206 sets the specific time period as the capacitor-use permitted time.

Furthermore, the CPU 206 sets, when a ratio of the learning result of the FAX mode to the learning result of the other operation mode in a specific time period is smaller than a predetermined ratio, the specific time period as the capacitor-use permitted time. More particularly, in the first modified example, the CPU 206 adds up the total execution time, as the learning result, of all the operation modes in the specific time period, and also adds up the number of executions of all the operation modes in the specific time period. Then, the CPU 206 compares a result of the addition with the learning result of the FAX mode. When the percentage of the learning result of the FAX mode to the result of the addition is smaller than a predetermined percentage, the CPU 206 sets the specific time period as the capacitor-use permitted time.

Figure 12:
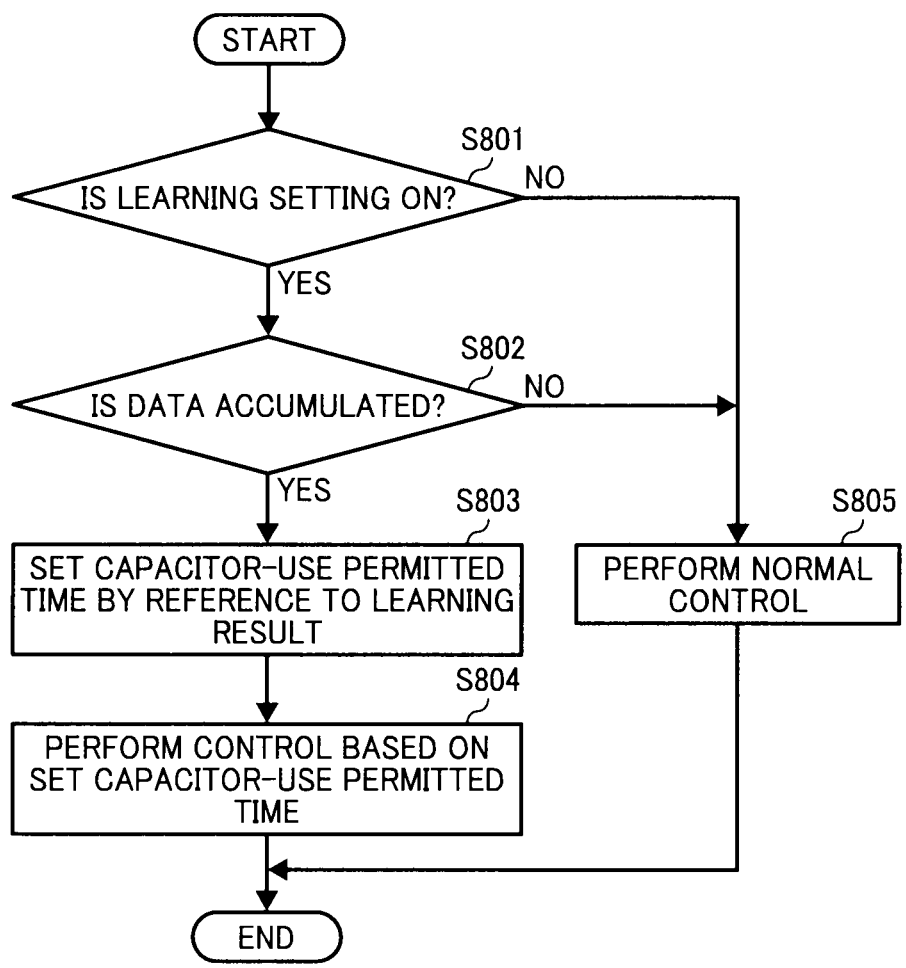
FIG. 12 is a flowchart of a process of setting a capacitor-use permitted time according to the first modified example of the second embodiment.

A process of setting the capacitor-use permitted time according to the first modified example is described in detail below with reference to FIG. 12. FIG. 12 is a flowchart of the process of setting the capacitor-use permitted time according to the first modified example.

The CPU 206 determines whether a learning setting for setting the capacitor-use permitted time with use of the table shown in FIG. 11 is ON (Step S801). In the first modified example, the CPU 206 receives ON or OFF of the learning setting via the operating unit (not shown), and stores a set value in the RAM 208.

When the learning setting is ON (YES at Step S801), the CPU 206 determines whether an amount of accumulated data indicating a result of counting the total execution time and the number of executions of each of the operation modes of the MFP is equal to or larger than a predetermine amount (Step S802).

When the amount of accumulated data indicating the result of counting the total execution time and the number of executions of each of the operation modes of the MFP is equal to or larger than the predetermine amount (YES at Step S802), the CPU 206 sets the capacitor-use permitted time by using the first learning-result table shown in FIG. 7 (Step S803). Then, the CPU 206 determines whether a time counted by the clock circuit 112 is within the set capacitor-use permitted time, and controls discharge of the capacitor C based on a result of the determination (Step S804). The process of determining whether the time counted by the clock circuit 112 is within the set capacitor-use permitted time, and the process of controlling the discharge of the capacitor C are the same as those described in the first embodiment, and therefore, the same explanation is not repeated.

When the learning setting is OFF (NO at Step S801), or when the amount of accumulated data indicating the result of counting the total execution time and the number of executions of each of the operation modes of the MFP is not equal to or larger than the predetermined amount (NO at Step S802), the CPU 206 does not set the capacitor-use permitted time, permits the discharge of the capacitor C, and performs normal control on the MFP (Step S805). In the first modified example, when the time counted by the clock circuit 112 is within the capacitor-use permitted time, the CPU 202 outputs the charge control signal indicating the charge instruction to the charger 110, and outputs the discharge control signal indicating the discharge instruction to the discharge circuit 111.

In this manner, in the MFP according to the first modified example, the time period in which the total execution time and the number of executions of each of the operation modes of the MFP exceed the values, respectively, is set as the capacitor-use permitted time. Therefore, charge and discharge of the capacitor C can be controlled according to the user's usage. Thus, unnecessary charge and unnecessary discharge of the capacitor C can be reduced without decreasing user's usability. As a result, the lifetime of the capacitor C can be lengthened.

A second modified example of the second embodiment is described in detail below. In the second modified example, when both the capacitor-use permitted time that has been received by the CPU 206 as described in the first embodiment and the capacitor-use permitted time that has been set by the CPU 206 as described in the first modified example of the second embodiment are stored in the RAM 208, the capacitor-use permitted time is set according to the capacitor-use permitted time having a higher priority order that is set in advance. The configuration of the MFP and the functional configurations implemented by the engine control circuit 105 and the charge-discharge control circuit 106 according to the second modified example are the substantially same as those described in the first embodiment and the first modified example of the second embodiment, and therefore, only processing different from those of the first embodiment and the first modified example of the second embodiment is described in detail below.

The CPU 206 sets a priority order to the capacitor-use permitted time that has been received by the CPU 206 as described in the first embodiment and the capacitor-use permitted time that has been set by the CPU 206 as described in the first modified example of the second embodiment. In the second modified example, the CPU 206 receives a setting of the priority order from an external PC via the operating unit (not shown) or a network, and stores the received set value in the RAM 208.

Figure 13:
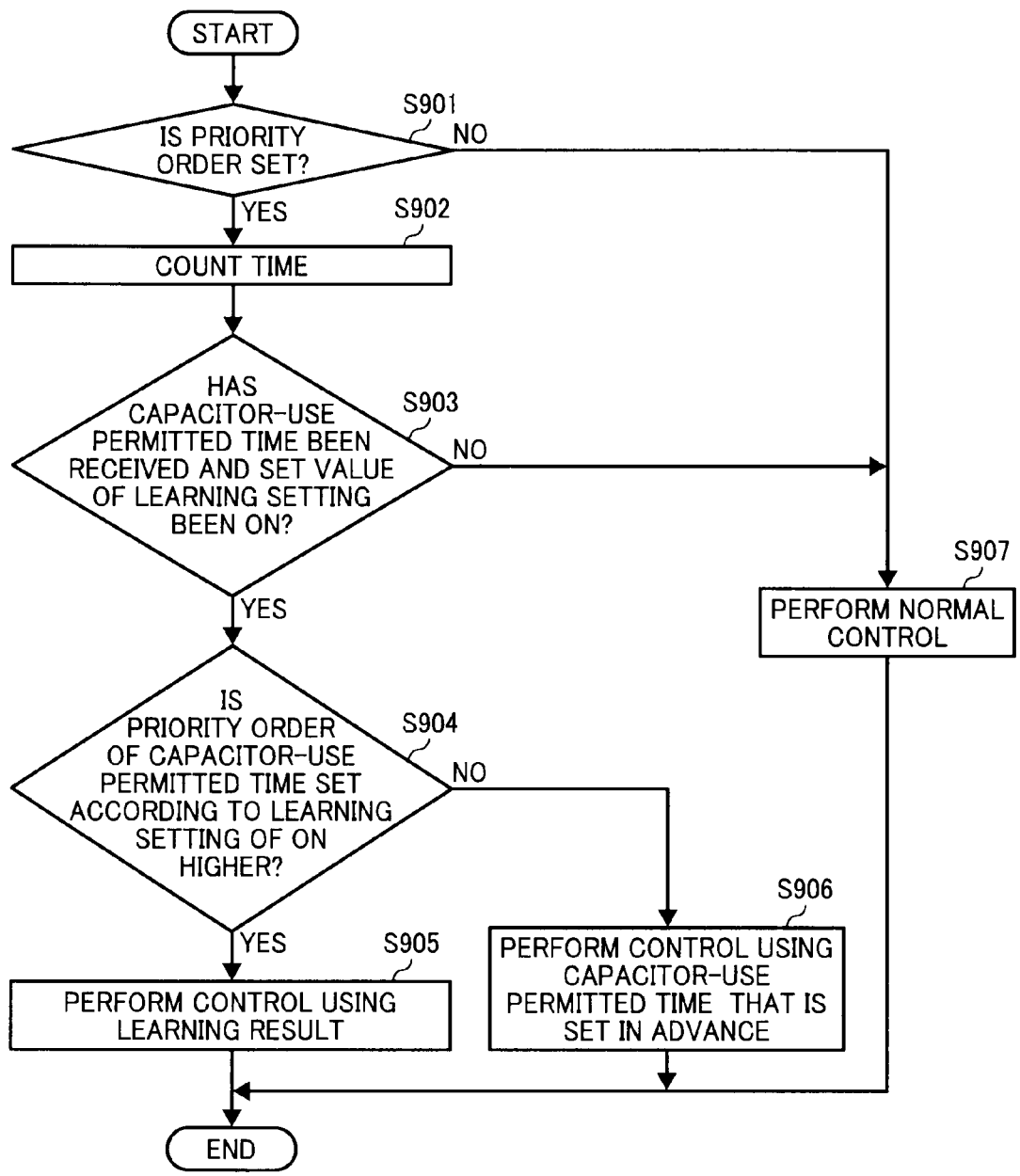
FIG. 13 is a flowchart of a process of controlling a capacitor by an engine control circuit and a charge-discharge control circuit according to a second modified example of the second embodiment.

A process of controlling the capacitor C by the engine control circuit 105 and the charge-discharge control circuit 106 according to the second modified example is described in detail below with reference to FIG. 13. FIG. 13 is a flowchart of the process of controlling the capacitor C by the engine control circuit 105 and the charge-discharge control circuit 106 according to the second modified example.

The CPU 206 determines whether the priority order is set (Step S901). More particularly, in the second modified example, the CPU 206 determines whether the set value indicating the priority order is set in the RAM 208. When the priority order is set (YES at Step S901), the CPU 206 causes the clock circuit 112 to count time (Step S902). Then, the CPU 206 determines whether the capacitor-use permitted time has been received via the operating unit (not shown) and the set value of the learning setting is ON (Step S903).

When the priority order is not set (NO at Step S901), or when the capacitor-use permitted time has not been received or the set value of the learning setting is OFF (NO at Step S903), the CPU 206 performs normal control (Step S907). In the second modified example, when the time counted by the clock circuit 112 is within the capacitor-use permitted time, the CPU 202 outputs the charge control signal indicating the charge instruction to the charger 110, and outputs the discharge control signal indicating the discharge instruction to the discharge circuit 111.

On the other hand, when the capacitor-use permitted time has been received and the setting of the learning setting is ON (YES at Step S903), the CPU 206 determines whether the priority order of the capacitor-use permitted time that has been set according to the learning setting of ON (i.e., the capacitor-use permitted time that has been set by the CPU 206 as described in the second embodiment and the first modified example of the second embodiment) is higher than the priority order of the capacitor-use permitted time that has been set in advance (i.e., the capacitor-use permitted time that has been received by the CPU 206 as described in the first embodiment) (Step S904). When the priority order of the capacitor-use permitted time that has been set according to the learning setting of ON is higher than the priority order of the capacitor-use permitted time that has been set in advance (YES at Step S904), the CPU 206 performs control by using the learning result (Step S905). More particularly, the processes from Step S802 to Step S804 of FIG. 12 are performed. On the other hand, when the priority order of the capacitor-use permitted time that has been set by the CPU 206 as described in the second embodiment is lower than the priority order of the capacitor-use permitted time that has been set in advance (NO at Step S904), the CPU 206 performs control by using the capacitor-use permitted time that has been set in advance (Step S906). More particularly, the processes from Step S402 to Step S405 of FIG. 4 are performed.

In this manner, in the MFP according to the second modified example, when both the capacitor-use permitted time that has been received by the CPU 206 as described in the first embodiment and the capacitor-use permitted time that has been set by the CPU 206 as described in the second embodiment are stored in the RAM 208, a user is allowed to set which one of the capacitor-use permitted times is prioritized as appropriate. Therefore, charge and discharge of the capacitor C can be controlled according to user's usage. As a result, unnecessary charge and unnecessary discharge of the capacitor C can be reduced without decreasing user's usability of the MFP.

A third modified example of the second embodiment is described in detail below. In the second embodiment, and the first and the second modified examples of the second embodiment, the usage state of the capacitor C in a specific time period is determined based on the execution states of the copy mode, the printer mode, and the FAX mode. However, each of the operation modes of the MFP includes various detailed modes, and determination of the usage state of the capacitor C depends on the detailed modes. In the third modified example, the usage state of the capacitor C in a specific time period is determined based on the execution states of the detailed modes.

The copy mode includes an automatic document feeder (ADF) mode in which an ADF is used and a normal mode in which the ADF is not used. When the copy process is performed in the ADF mode, consumption power increases, so that it is preferable to use electrical energy released by the capacitor C. On the other hand, in the copy process performed in the normal mode in which the ADF is not used, consumption power is lower than that in the ADF mode, so that it is not necessary to use the electrical energy released by the capacitor C.

Therefore, in the third modified example, the ADF mode of the copy mode is assumed as the operation mode in which the capacitor C needs to be used, and the normal mode of the copy mode is assumed as the operation mode in which the capacitor C need not be used.

The printer mode includes a first mode and a second mode. In the first mode, a document stored in a hard disk drive (HDD) or an external storage medium such as a secure digital (SD) card is printed. In the second mode, a document that is sent, together with a print request for printing the document, from a PC via a network such as the Internet is printed. In the first mode, a person who prints the document generally performs printing operation near the MFP, so that the printing process needs to be performed at a fast processing speed, resulting in consuming a large amount of power. Therefore, it is preferable to use the electrical energy released by the capacitor C in the first mode. On the other hand, in the second mode, because data as a printing object is sent from the PC, it is not necessary to perform the printing process as fast as that of the first mode. Accordingly, consumption amount of power is less than that of the first mode. Therefore, it may not be necessary to use the electrical energy released by the capacitor C in the second mode.

Thus, in the third modified example, the first mode of the printer mode is assumed as the operation mode in which the capacitor C needs to be used, and the second mode of the printer mode is assumed as the operation mode in which the capacitor C need not be used.

The FAX mode includes a FAX transmission mode in which a FAX is transmitted to an external apparatus, a FAX reception mode in which a FAX is received from the external apparatus and then printed out, and an Internet reception mode in which a FAX is received from an external apparatus and the received FAX data is transmitted to a user by using an e-mail. In the FAX reception mode, the received FAX needs to be printed, so that the fixing heater HT2 is used and the printing process needs to be performed at a fast processing speed, resulting in consuming a large amount of power. Therefore, it is preferable to use the electrical energy released by the capacitor C in the FAX reception mode.

On the other hand, in the FAX transmission mode and the Internet reception mode, FAX data need not be printed, so that the fixing heater HT2 is not used. Accordingly, consumption amount of power is less than that of the FAX reception mode. Therefore, it is not necessary to use the electrical energy released by the capacitor C in the FAX transmission mode and the Internet reception mode.

Thus, in the third modified example, the FAX reception mode of the FAX mode is assumed as the operation mode in which the capacitor C needs to be used, and the FAX transmission mode and the Internet reception mode of the FAX mode are assumed as the operation modes in which the capacitor C need not be used.

As described above, in the third modified example, each of the detailed modes of each of the operation modes is specified either as the operation mode in which the capacitor C needs to be used or the operation mode in which the capacitor C need not be used. Then, the execution state of each of the detailed modes is detected and stored as the learning result in either the first learning-result table or the second learning-result table, in the same manner as described in the second embodiment. The CPU 206 then sets the capacitor-use permitted time according to the procedures as shown in FIGS. 9 and 10.

More particularly, the CPU 206 detects the total execution time and the number of executions of each of the ADF mode of the copy mode, the first mode of the printer mode, and the FAX reception mode of the FAX mode in a specific time period, and stores a result of the detection in the first learning-result table as shown in FIG. 7. Then, the CPU 206 sets the capacitor-use permitted time according to the procedure shown in FIG. 9.

The CPU 206 also detects the total execution time and the number of executions of each of the normal mode of the copy mode, the second mode of the printer mode, and the FAX transmission mode and the Internet reception mode of the FAX mode in a specific time period. At the same time, the CPU 206 detects the total execution time and the number of executions of each mode other than the above-listed modes, that is, the CPU 206 detects the total execution time and the number of executions of each of the ADF mode of the copy mode, the first mode of the printer mode, and the FAX reception mode of the FAX mode in the same specific time period. Then, the CPU 206 stores these learning results in the second learning-result table as shown in FIG. 8, and sets the capacitor-use permitted time according to the procedure shown in FIG. 10.

The process of controlling the capacitor C by the engine control circuit 105 and the charge-discharge control circuit 106 is performed in the same manner as the process of controlling the capacitor C described with reference to FIG. 4 in the first embodiment.

In this manner, in the third modified example, the usage state of the capacitor C in a specific time period is determined based on the execution state of each of the detailed modes of each of the operation modes of the MFP, and performs the process of controlling the capacitor C. Therefore, the usage state of the capacitor C can be determined more accurately, resulting in further lengthening the lifetime of the capacitor C.

A third embodiment of the present invention is described in detail below. In the second embodiment and the first to the third modified examples of the second embodiment, the usage state of the capacitor C is determined based on the execution states of the operation modes of the MFP. In the third embodiment, the usage state of the capacitor C is determined based on a usage state of a fixing device such as the fixing heater HT2 and the fixing roller 109, and the process of controlling the capacitor C is performed based on the usage state of the fixing device.

The configuration of the MFP and the functional configurations implemented by the engine control circuit 105 and the charge-discharge control circuit 106 are the substantially same as those described in the first embodiment, and therefore, only processing different from that of the first embodiment is described in detail below.

When the fixing device, such as the fixing heater HT2 and the fixing roller 109, is used, the number of recording media that has been subjected to processing by the fixing device is stored as the number of transmitted sheets in the RAM 208 of the engine control circuit 105. In the MFP, the CPU 206 reads the number of transmitted sheets as the usage state of the fixing device for each of predetermined time periods from the RAM 208. The number of transmitted sheets for each of the time periods is stored as a learning-result table in the RAM 208. FIG. 14 is an example of contents of the learning-result table according to the third embodiment. In the table shown in FIG. 14, the number of transmitted sheets is registered for each of the time periods of each day of a week.

The CPU 206 determines, by reference to the learning-result table, whether the number of transmitted sheets in each of the time periods is equal to or larger than a predetermined number. Then, the CPU 206 determines the usage state of the capacitor C based on a result of the determination, and sets each of the time periods as either the capacitor-use permitted time or the capacitor-use stop time in the RAM 208 based on the usage state of the capacitor C.

A process of setting the capacitor-use permitted time by the MFP having the above configuration according to the third embodiment is described in detail below. FIG. 15 is a flowchart of the process of setting the capacitor-use permitted time according to the third embodiment.

The CPU 206 determines, by reference to the learning-result table stored in the RAM 208, whether the number of transmitted sheets in a specific time period is equal to or larger than a predetermined number (Step S31). When the number of transmitted sheets is equal to or larger than the predetermined number (YES at Step S31), the CPU 206 determines that, as the usage state of the capacitor C in the specific time period, the operating time of the capacitor C is long or the number of operating the capacitor C is large, and sets the specific time period as the capacitor-use permitted time in the RAM 208 (Step S32).

On the other hand, when the number of transmitted sheets is smaller than the predetermined number (NO at Step S31), the CPU 206 determines that, as the usage state of the capacitor C in the specific time period, the operating time of the capacitor C is short or the number of operating the capacitor C is small, sets the specific time period as the capacitor-use stop time in the RAM 208 (Step S33).

The CPU 206 repeats the processes from Step S31 to Step S33 until setting for all time periods of all days registered in the learning-result table is completed (Step S34).

The capacitor-use permitted time and the capacitor-use stop time set in the manner as described above are stored in the table of FIG. 3, which contains the capacitor-use permitted time for each day of a week, in the same manner as described in the first embodiment.

The process of controlling the capacitor C by the engine control circuit 105 and the charge-discharge control circuit 106 according to the third embodiment is performed by reference to the table of FIG. 3, which contains the capacitor-use permitted time, in the same manner as the process of controlling the capacitor C described with reference to FIG. 4 in the first embodiment.

In this manner, in the MFP according to the third embodiment, the number of the recording media that have been subjected to processing by the fixing device is detected as the number of transmitted sheets, and then the capacitor-use permitted time is set based on the number of transmitted sheets. Therefore, the capacitor-use permitted time can be set more accurately according to the usage state of the fixing device, which is closely linked to the actual usage state of the capacitor C. Therefore, charge and discharge of the capacitor C can be controlled such that unnecessary charge and unnecessary discharge of the capacitor C can be reduced without decreasing user's usability of the MFP. As a result, the lifetime of the capacitor C can be lengthened.

While, in the third embodiment, the usage state of the fixing device is detected based on the number of transmitted sheets, the present invention is not limited to this example. Any other factors that can detect the usage state of the fixing device can be used instead of the number of transmitted sheets.

A fourth embodiment of the present invention is described in detail below. In the third embodiment, the usage state of the capacitor C is determined based on the usage state of the fixing device. However, in the fourth embodiment, the usage state of the capacitor C is determined based on a signal sent from the capacitor C, and the capacitor C is controlled based on the usage state of the capacitor C.

The configuration of the MFP and the functional configurations implemented by the engine control circuit 105 and the charge-discharge control circuit 106 according to the fourth embodiment are the substantially same as those described in the first embodiment, and therefore, only processing different from that of the first embodiment is described in detail below.

When the capacitor C charges or discharges, as shown in FIG. 1, the capacitor charging voltage signal is sent from the capacitor C to the charge-discharge control circuit 106. Then, the charge-discharge control circuit 106 sends the capacitor charging voltage signal received from the capacitor C to the engine control circuit 105.

Figures 16, 17:
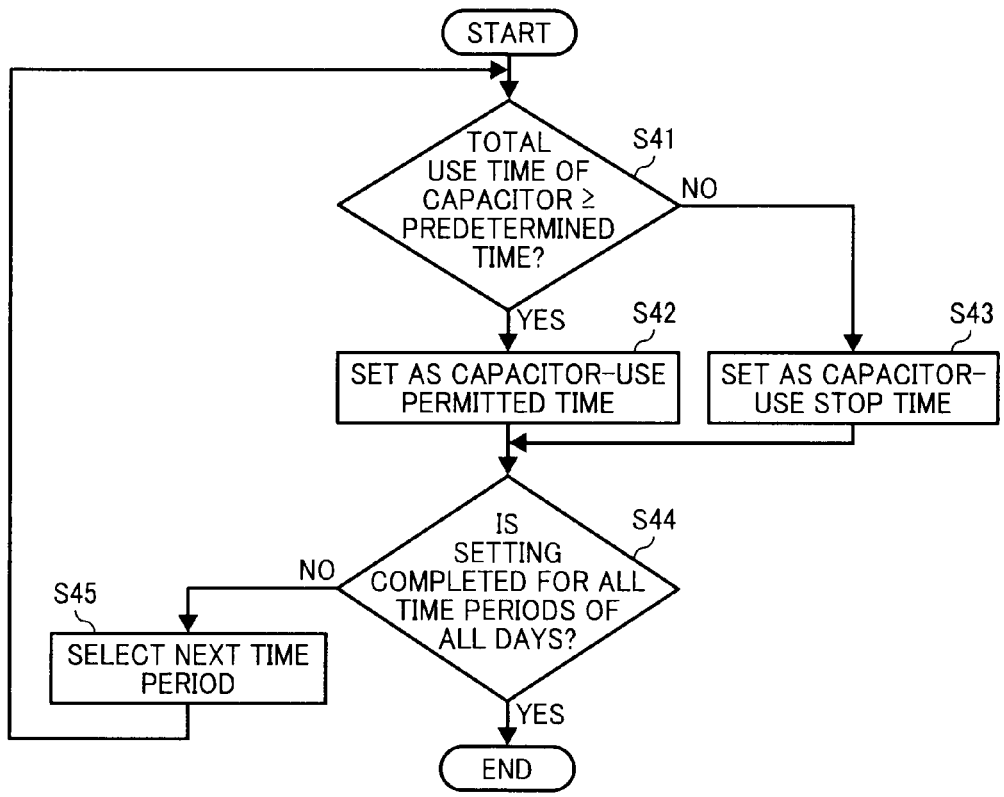
FIG. 16 is an example of contents of a learning-result table according to a fourth embodiment of the present invention.
FIG. 17 is a flowchart of a process of setting a capacitor-use permitted time according to the fourth embodiment.

The CPU 206 of the engine control circuit 105 receives the capacitor charging voltage signal, counts time during which the capacitor charging voltage signal is being sent, and calculates the total time of the counted time for each of predetermined time periods. The CPU 206 stores the total time in each of the time periods as a capacitor-use total time and as a learning-result table in the RAM 208. FIG. 16 is an example of contents of the learning-result table according to the fourth embodiment. In the table shown in FIG. 16, the capacitor-use total time is registered for each of the time periods of each day of a week.

The CPU 206 determines, by reference to the learning-result table shown in FIG. 16, whether the capacitor-use total time in each of the time periods is equal to or longer than a predetermined time, and determines the usage state of the capacitor C based on a result of the determination. Then, the CPU 206 sets each of the time periods as either the capacitor-use permitted time or the capacitor-use stop time in the RAM 208 based on the usage state of the capacitor C.

A process of setting the capacitor-use permitted time by the MFP having the above configuration according to the fourth embodiment is described in detail below. FIG. 17 is a flowchart of the process of setting the capacitor-use permitted time according to the fourth embodiment.

The CPU 206 determines, by reference to the learning-result table stored in the RAM 208, whether the capacitor-use total time for a specific time period is equal to or longer than a predetermined time (Step S41). When the capacitor-use total time is equal to or longer than the predetermined time (YES at Step S41), the CPU 206 determines that, as the usage state of the capacitor C in the specific time period, the operating time of the capacitor C is long or the number of operating the capacitor C is large, and sets the specific time period as the capacitor-use permitted time in the RAM 208 (Step S42).

On the other hand, when the capacitor-use total time is smaller than the predetermined time (NO at Step S41), the CPU 206 determines that, as the usage state of the capacitor C in the specific time period, the operating time of the capacitor C is short or the number of operating the capacitor C is small, and sets the specific time period as the capacitor-use stop time in the RAM 208 (Step S43).

Then, the CPU 206 repeats the processes from Step S41 to Step S43 until setting for all time periods of all days registered in the learning-result table is completed (Step S44).

The capacitor-use permitted time and the capacitor-use stop time set in the manner as described above are stored in the table of FIG. 3, which contains the capacitor-use permitted time, in the same manner as described in the first embodiment.

The process of controlling the capacitor C by the engine control circuit 105 and the charge-discharge control circuit 106 is performed by reference to the table of FIG. 3, which contains the capacitor-use permitted time, in the same manner as the process of controlling the capacitor C described with reference to FIG. 4 in the first embodiment.

In this manner, in the MFP according to the fourth embodiment, the capacitor-use total time as the total use time of the capacitor C is calculated for each of the time periods, and the capacitor-use permitted time is set based on the capacitor-use total time. Therefore, the capacitor-use permitted time can be more accurately set. Thus, charge and discharge of the capacitor C can be controlled such that unnecessary charge and unnecessary discharge of the capacitor C is reduced without decreasing user's usability of the MFP. As a result, the lifetime of the capacitor C can be lengthened.

While, in the fourth embodiment, the usage state of the capacitor C is determined based on the capacitor charging voltage signal received from the capacitor C, the present invention is not limited to this example. Any other factors that enable determination of the usage state of the capacitor C can be used instead of the capacitor charging voltage signal.

Furthermore, in the fourth embodiment, the total time during which the capacitor charging voltage signal is sent in each of the time periods is regarded as the capacitor-use total time, and then the usage state of the capacitor C is determined based on the capacitor-use total time. However, the present invention is not limited to this example. For example, it is possible to count the number of times of receiving the capacitor charging voltage signal in each of the time periods and determine the usage state of the capacitor C based on the number of times of receiving the capacitor charging voltage signal in each of the time periods.

A fifth embodiment of the present invention is described in detail below. An MFP according to the fifth embodiment permits discharge of the capacitor C when the operation mode is a discharge permitted mode in which the discharge of the capacitor C is permitted. Therefore, unnecessary charge and unnecessary discharge of the capacitor C can be reduced without decreasing user's usability. The configuration of the MFP and the functional configurations implemented by the engine control circuit 105 and the charge-discharge control circuit 106 are the substantially same as those described in the first embodiment, and therefore, only processing different from that of the first embodiment is described in detail below.

Figures 18, 19:
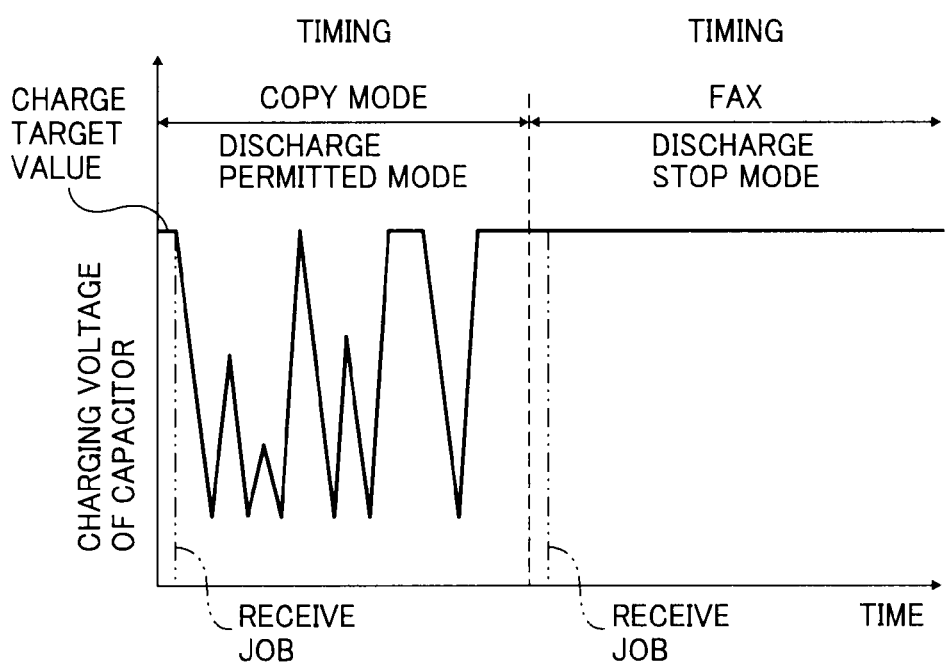
FIG. 18 illustrates a table containing a correspondence between each operation mode and a discharge permitted mode according to a fifth embodiment of the present invention.
FIG. 19 is a graph of a voltage of a capacitor controlled by an engine control circuit and a charge-discharge control circuit according to the fifth embodiment.

The RAM 208 stores therein the operation mode in which the discharge of the capacitor C is permitted (hereinafter, "discharge permitted mode"). More particularly, in the fifth embodiment, the RAM 208 stores therein whether each of the copy mode, the printer mode, a scanner mode, and the FAX mode is set as the discharge permitted mode. FIG. 18 illustrates a table containing a correspondence between each of the operation modes and the discharge permitted mode. In the table shown in FIG. 18, the operation modes corresponding to circles of a column of "ON" of an item "capacitor" are set as the discharge permitted mode. For example, data to be processed in the FAX mode is generally received regardless of intent of a user. In such a case, the user may not matter if the MFP is activated at a high speed. Therefore, the FAX mode is not set as the discharge permitted mode for processing received data.

The CPU 206 determines whether the operation mode of the MFP, which is a determination object for which whether discharge of the capacitor C is permitted is determined, is the discharge permitted mode. More particularly, in the fifth embodiment, the CPU 206 determines whether the operation mode of the MFP corresponds to the discharge permitted mode (i.e., the copy mode or the printer mode) in the table shown in FIG. 18. When the operation mode of the MFP corresponds to the discharge permitted mode, the CPU 206 sends, to the CPU 202, an instruction for permitting the discharge circuit 111 to discharge charge from the capacitor C. While, in the fifth embodiment, the table shown in FIG. 18 is stored in the RAM 208 in advance, the present invention is not limited to this example. For example, it is possible to receive the setting of the discharge permitted mode via the operating unit (not shown) to update the table stored in the RAM 208.

Only when receiving the instruction for permitting the discharge circuit 111 to discharge charge from the capacitor C, that is, only when it is determined that the operation mode of the MFP corresponds to the discharge permitted mode, the CPU 202 permits the discharge of the capacitor C and performs normal control. For example, when the operation mode of the MFP is the FAX mode, an instruction for stopping the discharge of the capacitor C is sent to the CPU 202. Therefore, the MFP operates without using the electrical energy stored in the capacitor C (for example, by reducing a line speed of the fixing roller 109) for outputting the received data in the FAX mode. As a result, the number of times of charge and discharge of the capacitor C can be reduced.

FIG. 19 is a graph of a voltage of the capacitor C controlled by the engine control circuit 105 and the charge-discharge control circuit 106 according to the fifth embodiment. As shown in FIG. 19, in the copy mode (i.e., the discharge permitted mode), charge and discharge of the capacitor C is permitted, so that the charging voltage of the capacitor C repeatedly increases and decreases according to the discharge of the capacitor C by the discharge circuit 111. On the other hand, in the FAX mode, (i.e., a discharge stop mode in which discharge of the capacitor C is stopped), charge and discharge of the capacitor C is stopped, so that the charging voltage of the capacitor C is maintained at the charge target value. Therefore, when the MFP is in the FAX mode, power is supplied to the electric loads of the MFP without using the electrical energy stored in the capacitor C.

In this manner, in the MFP according to the fifth embodiment, the discharge of the capacitor C is permitted only when the operation mode of the MFP corresponds to the discharge permitted mode in which the discharge of the capacitor C is permitted. For example, it is possible to supply power to the electric loads of the MFP without using the electrical energy stored in the capacitor C in the operation mode in which data processing that is not intended by a user is performed. Therefore, it is possible to reduce unnecessary charge and unnecessary discharge of the capacitor C without decreasing the user's usability.

In the fifth embodiment, similar to the third modified example of the second embodiment, it is possible to determine whether each of the detailed modes of each of the operation modes corresponds to the discharge permitted mode.

According to one aspect of the present invention, when an image forming apparatus need not start up at a fast speed, charge and discharge of a capacitor are stopped. Therefore, unnecessary charge and unnecessary discharge of the capacitor can be reduced. As a result, lifetime of the capacitor can be lengthened.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a charge storage unit capable of charging and discharging;
   a charging unit that charges the charge storage unit with power from a power source;
   a discharging unit that discharges the charge storage unit and supplies a discharge power to a load;
   a setting unit that determines whether, during a predetermined time period, at least one of a total executing time and a number of executions satisfies a predetermined condition, and when the predetermined condition is satisfied, sets a charge-use permission for the predetermined time period; and
   a control unit that determines whether a current time of day corresponds to the predetermined time period having the charge-use permission set, and when the current time of day is determined to correspond to the predetermined time period having the charge-use permission set, allows the discharging unit to discharge the charge storage unit.

2. The image forming apparatus according to claim 1, further comprising:
   a receiving unit that receives an input of a charge-use permitted time; and
   a priority setting unit that sets a priority of the charge-use permitted time received by the receiving unit and the charge-use permitted time set by the setting unit, wherein
   the control unit determines whether a measured time falls in a charge-use permitted time having a higher priority.

3. The image forming apparatus according to claim 1, wherein the control unit allows the charging unit to charge the charge storage unit before the charge-use permission is set.

4. The image forming apparatus according to claim 1, wherein the control unit forces the discharging unit to discharge the charge storage unit after the charge-use permission is no longer set.

5. The image forming apparatus according to claim 1, wherein the charge storage unit is either one of a capacitor and a secondary battery.

6. A method of controlling a power supply in an image forming apparatus that includes a charge storage unit capable of charging and discharging, the method comprising:
- charging the charge storage unit with a power from a power source;
- discharging which supplies a discharge power to a load;
- setting, including,
  - determining, during a predetermined time period, whether at least one of a total executing time and a number of executions satisfies a predetermined condition, and
  - setting, when the predetermined condition is determined to be satisfied, a charge-use permission for the predetermined time period; and
- controlling, including,
  - determining whether a current time of day corresponds to the predetermined time period having the charge-use permission set, and
  - allowing, when the current time of day is determined to correspond to the predetermined time period having the charge-use permission set, the discharging to discharge the charge storage unit.

7. A computer program product comprising a non-transitory computer-usable medium having computer-readable program codes embodied in the non-transitory computer-usable medium for controlling a power supply in an image forming apparatus that includes a charge storage unit capable of charging and discharging, the program codes when executed causing a computer to perform a method comprising:
- charging the charge storage unit with a power from a power source;
- discharging which supplies a discharge power to a load;
- setting, including,
  - determining, during a predetermined time period, whether at least one of a total executing time and a number of executions satisfies a predetermined condition, and
  - setting, when the predetermined condition is determined to be satisfied, a charge-use permission for the predetermined time period; and
- controlling, including,
  - determining whether a current time of day corresponds to the predetermined time period having the charge-use permission set, and
  - allowing, when the current time of day is determined to correspond to the predetermined time period having the charge-use permission set, the discharging to discharge the charge storage unit.

* * * * *